(12) United States Patent
Beer-Gingold et al.

(10) Patent No.: US 9,948,928 B2
(45) Date of Patent: Apr. 17, 2018

(54) METHOD AND APPARATUS FOR ENCODING AN IMAGE

(75) Inventors: Shlomo Beer-Gingold, Guivat Shmuel (IL); Ofer Naaman, Hod-Hasharon (IL); Michael Zarubinsky, Hertzella (IL)

(73) Assignee: NXP USA, Inc., Austin, TX (US)

( * ) Notice: Subject to any disclaimer, the term of this patent is extended or adjusted under 35 U.S.C. 154(b) by 489 days.

(21) Appl. No.: 14/131,368

(22) PCT Filed: Jul. 20, 2011

(86) PCT No.: PCT/IB2011/053237
§ 371 (c)(1),
(2), (4) Date: Jan. 7, 2014

(87) PCT Pub. No.: WO2013/011355
PCT Pub. Date: Jan. 24, 2013

(65) Prior Publication Data
US 2014/0133552 A1     May 15, 2014

(30) Foreign Application Priority Data

Jul. 20, 2011 (WO) .................. PCT/IB2011/053237

(51) Int. Cl.
| | |
|---|---|
| *H04N 11/02* | (2006.01) |
| *H04N 19/635* | (2014.01) |
| *H04N 19/513* | (2014.01) |
| *H04N 19/13* | (2014.01) |
| *H04N 19/63* | (2014.01) |
| *H04N 19/136* | (2014.01) |
| *H04N 19/169* | (2014.01) |

(Continued)

(52) U.S. Cl.
CPC ....... *H04N 19/00824* (2013.01); *H04N 19/13* (2014.11); *H04N 19/136* (2014.11); *H04N 19/1883* (2014.11); *H04N 19/426* (2014.11); *H04N 19/513* (2014.11); *H04N 19/63* (2014.11); *H04N 19/635* (2014.11); *H04N 19/93* (2014.11)

(58) Field of Classification Search
USPC ....................................... 375/240.01–240.29
See application file for complete search history.

(56) References Cited

U.S. PATENT DOCUMENTS

| | | |
|---|---|---|
| 5,960,401 A | 9/1999 | Rao et al. |
| 7,215,820 B2 | 5/2007 | Zandi et al. |
| 7,492,955 B2 | 2/2009 | Zandi et al. |

(Continued)

OTHER PUBLICATIONS

International Search Report and Written Opinion correlating to PCT/IB2011/053237 dated Feb. 23, 2012.

(Continued)

*Primary Examiner* — Leron Beck

(57) ABSTRACT

A method for processing an image, the method comprising retrieving an image, encoding the image as a string of components, deriving an exponent for each component, deriving mantissas wherein at least an approximation of each component can be derived from the exponents and mantissas, and wherein each exponent indicates the number of bits in its accompanying mantissa, compressing at least the exponents, and storing the exponents and the mantissas in a memory. There is also provided a apparatus for processing an image.

20 Claims, 6 Drawing Sheets

(51) Int. Cl.
*H04N 19/426* (2014.01)
*H04N 19/93* (2014.01)

(56) References Cited

U.S. PATENT DOCUMENTS

| | | |
|---|---|---|
| 7,634,145 B2 | 12/2009 | Keith et al. |
| 2004/0165667 A1* | 8/2004 | Lennon ............... G10L 19/173 375/242 |
| 2009/0202164 A1 | 8/2009 | Rossato et al. |
| 2010/0158136 A1 | 6/2010 | Peng et al. |
| 2010/0220783 A1 | 9/2010 | Mallat et al. |

OTHER PUBLICATIONS

Aswe, et al., "JPEG, From Concept to C++ Mounting," 2nd Ed., Jan. 5, 2005, published by Softbank Publishing Co., Ltd, pp. 27-29. (English translation of a portion attached—reference was cited in foreign office action).

Nagasawa, K. et al., "Multi-function printer (MFP) and Image—and Signal-processing," Journal of the Institute of Image Electronics Engineers of Japan, Jan. 25, 2004, vol. 33, No. 1, pp. 53-62, published by the Institute of Image Electronics Engineers of Japan. (English translation of a portion attached—reference was cited in foreign office action).

Maeda, T., "Short Lesson: JPEG Codec," Journal of Japan Society for Fuzzy Theory and System, Apr. 15, 1999, vol. 11, No. 2, pp. 259-262, published by the Japan Society for Fuzzy Theory and System. (English translation of a portion attached—reference was cited in foreign office action).

Tanaka, M., "Proposal of Coding Method Suitable for Data from Single-plate Color Image Sensor," Journal of the Institute of Image Electronics Engineers of Japan, Sep. 25, 2007, vol. 36, No. 5, pp. 631-640, published by the Institute of Image Electronics Engineers of Japan. (English translation of a portion attached—reference was cited in foreign office action).

* cited by examiner

H = 2.666bpp → Zeroing → H = 1.437bpp

Fig. 8

| Component Value | Exponent | Exponent Binary Representation after Entropy Coding | Mantissa | Mantissa Binary Representation |
|---|---|---|---|---|
| 0 | 0 | 0 | . | . |
| -1 | 1 | 01 | 0 | 0 |
| 1 | | | 1 | 1 |
| -3 | 2 | 011 | 0 | 00 |
| -2 | | | 1 | 01 |
| 2 | | | 2 | 10 |
| 3 | | | 3 | 11 |
| -7 | 3 | 0111 | 0 | 000 |
| -6 | | | 1 | 001 |
| -5 | | | 2 | 010 |
| -4 | | | 3 | 011 |
| 4 | | | 4 | 100 |
| 5 | | | 5 | 101 |
| 6 | | | 6 | 110 |
| 7 | | | 7 | 111 |
| -15 | 4 | 01111 | 0 | 0000 |
| -14 | | | 1 | 0001 |
| -13 | | | 2 | 0010 |
| -12 | | | 3 | 0011 |
| -11 | | | 4 | 0100 |
| -10 | | | 5 | 0101 |
| -9 | | | 6 | 0110 |
| -8 | | | 7 | 0111 |
| 8 | | | 8 | 1000 |
| 9 | | | 9 | 1001 |
| 10 | | | 10 | 1010 |
| 11 | | | 11 | 1011 |
| 12 | | | 12 | 1100 |
| 13 | | | 13 | 1101 |
| 14 | | | 14 | 1110 |
| 15 | | | 15 | 1111 |

METHOD AND APPARATUS FOR ENCODING AN IMAGE

FIELD OF THE INVENTION

This invention relates to a method and apparatus for encoding an image.

BACKGROUND OF THE INVENTION

In recent years, the demand for high resolution video in TVs, computers and other devices capable of providing video has been increasing, and this demand is now also being felt in the portable devices market. As comparatively high definition screens have become more common among modern portable multimedia devices such as tablets, PCs and smart phones, high resolution video quality has become a key competitive differentiating factor.

With improved video quality comes smoother video, improved colour, fewer artefacts from resizing, compression or other image processing, and various other benefits. These improve the user experience in ways that go beyond a mere increase in the visible detail.

The most advanced video processing algorithms, such as motion compensated frame rate conversion or 3D-video processing, require multiple reads/writes of each video frame data from/to the external system memory. For high-resolution video on a portable multimedia device, and particularly high quality high-resolution video, the total memory access load can easily become unacceptably high.

In order to reduce load on the memory system, lossless (or almost lossless) frame buffer compression is frequently used, such as wavelet multiresolution processing. However, this approach has several drawbacks.

Notably, the compression methods used in decoding and encoding schemes such as h.264 are often not optimised for wavelet multiresolution processing.

In contrast, compression methods which are suitable for use with multiresolution processing often require unacceptably high memory usage, as they use several read passes through the frame to be encoded, and hence require the whole frame to be stored in the memory. Multiple passes also incur a high latency, which is undesirable in real time applications. These methods are also ill suited for use with many video stream sensors, which capture data on the fly and store it in smaller buffers, such that the buffer may contain only a line or block of pixels. These methods also require a complex system and a lot of power to operate.

One method is to encode the components of wavelet multiresolution processing in groups by deriving group exponents and individual mantissas, such that an approximation of each component can be derived from the group exponent combined with that component's mantissa. However this provides poor video quality, and as such is not a desirable solution.

SUMMARY OF THE INVENTION

The present invention provides a method and apparatus for encoding an image as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 8 is a table showing example components, exponents and mantissas; and

DETAILED DESCRIPTION OF THE PREFERRED EMBODIMENTS

Because the illustrated embodiments of the present invention may, for the most part, be implemented using electronic components and circuits known to those skilled in the art, details will not be explained in any greater extent than that considered necessary, for the understanding and appreciation of the underlying concepts of the present invention and in order not to obfuscate or distract from the teachings of the present invention.

Figure 1:
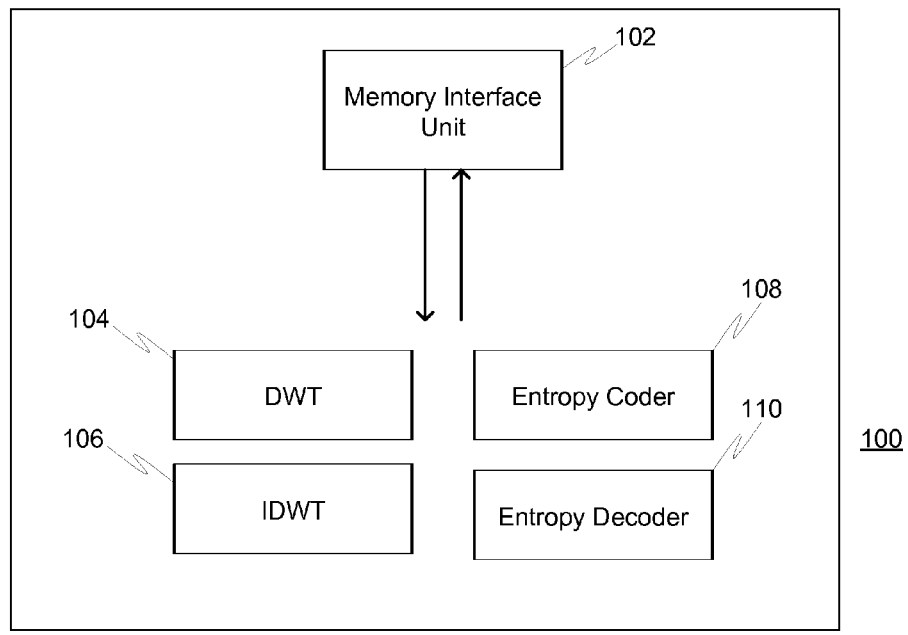
FIG. 1 schematically shows an example of a multimedia device.

FIG. 1 schematically shows an example of a multimedia device, such as an image processing device 100 which comprises a memory interface unit 102, a discrete waveform transform (DWT) unit 104, an inverse discrete waveform transform (IDWT) unit 106, an entropy coder 108 and an entropy decoder 110. In use, the DWT unit 104 and the entropy coder 108 cooperate a memory accessed through the memory interface unit 102 to encode a compressed image. The IDWT unit 106 and the entropy decoder 110 similarly cooperate with a memory accessed through the memory interface unit 102 to decode a compressed image.

Figure 2:
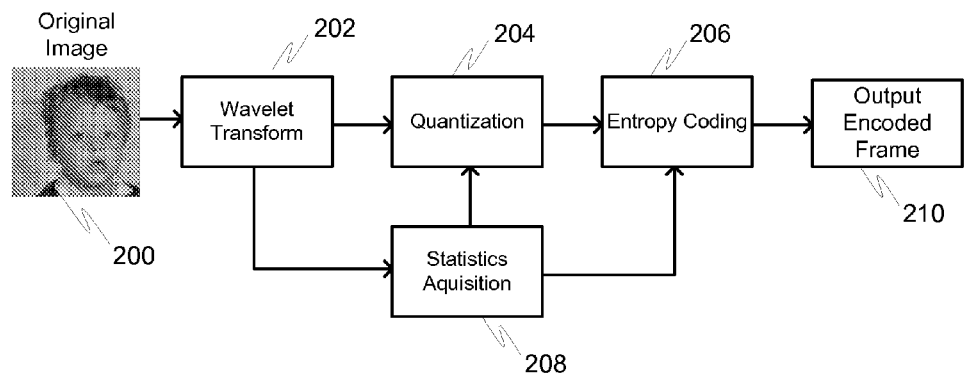
FIGS. 2 and 3 are flow diagrams of example image compression methods.

FIG. 2 is a flow diagram showing an overview of a method for compressing an image on an image processing device 100. In a method according to FIG. 2, the image processing device may be provided with an original image 200, or input frame, through the memory interface unit 102. The original image 200 may come from a system memory, from some other storage device, or from a sensor such as a camera. The original image 200 may be a complete image, or a portion thereof, or an encoding block taken from a larger image. Encoding a portion of an image, or an encoding block, reduces the amount of memory required for the encoding process.

The memory interface unit 102 passes the original image 200 to the DWT unit 104, where it undergoes wavelet transformation 202. Statistics of the transformed images may be calculated by a statistics acquisition unite 208 for use in the later stages of the encoding process. The transformed image then undergoes quantization 204 and entropy coding 206 to produce the output encoded frame 210.

Figure 3:
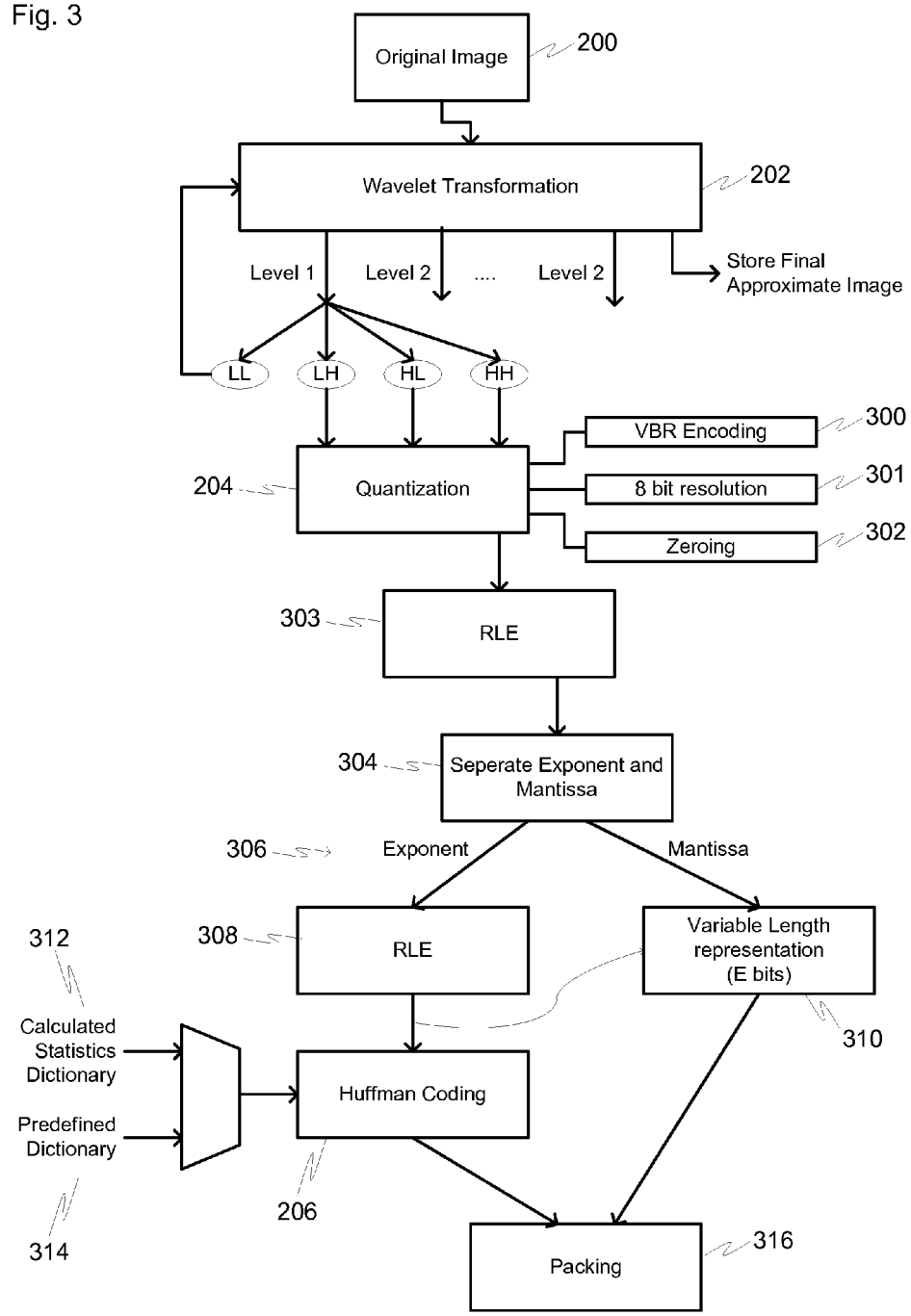

FIG. 3 shows the method of FIG. 2 in much greater detail. In the first part of FIG. 3, an original image 200 may be retrieved and passed to the DWT unit 104 to be encoded using a wavelet transformation 202, as shown in FIG. 2.

Figure 4:
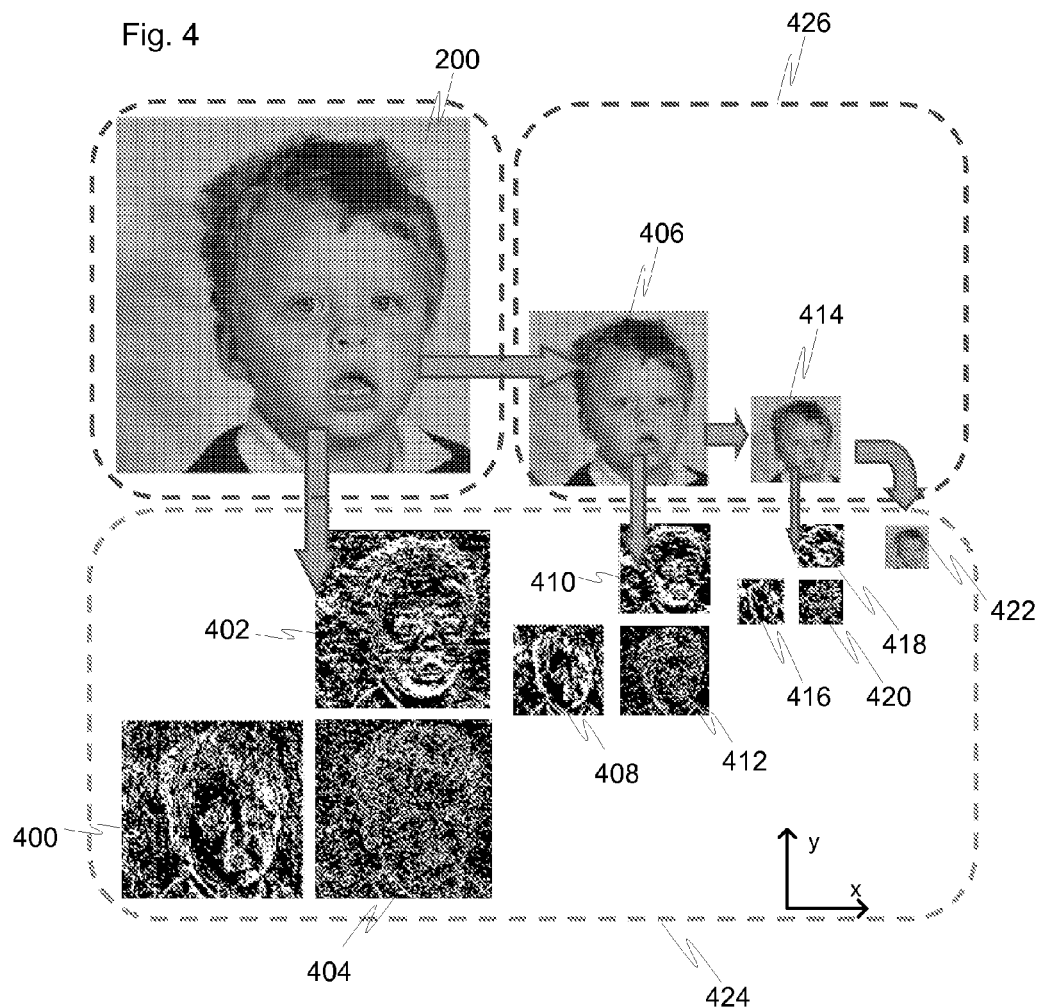
FIG. 4 illustrates an example of wavelet encoding.

FIG. 4 shows a wavelet transformation such as the one referred to in FIG. 3. The original image 200 may be broken down into Y, Cb and Cr parts, and each part may be high pass filtered to produce a string of components, here represented as three transformed images 400,402,404.

The components may be derived with the equations:

$$LL_1(p_1,q_1) = LL_0(p_0,q_0) + LL_0(p_0+1,q_0) + LL_0(p_0,q_0+1) + LL_0(p_0+1,q_0+1)$$

$$LH_1(p_1,q_1) = LL_0(p_0,q_0) + LL_0(p_0+1,q_0) - LL_0(p_0,q_0+1) - LL_0(p_0+1,q_0+1)$$

$$HL_1(p_1,q_1) = LL_0(p_0,q_0) - LL_0(p_0+1,q_0) + LL_0(p_0,q_0+1) - LL_0(p_0+1,q_0+1)$$

$$HH_1(p_1,q_1) = LL_0(p_0,q_0) - LL_0(p_0+1,q_0) - LL_0(p_0,q_0+1) + LL_0(p_0+1,q_0+1)$$

where:

$p_0 = 0, 2, 4, \ldots, p-1, p$
$q_0 = 0, 2, 4, \ldots, q-1, q$
p=width of the original image
q=height of the original image
$p_1 = p_0/2$; $q_1 = q_0/2$
$LL_0$ ($p_0$, $q_0$)=the value of the pixel at ($p_0$, $q_0$) in the original image
$LH_1$, $LH_1$, $HL_1$, $HH_1$—output components of the first decomposition level.

If the input resolution of the pixel components is 8 bits, the $LL_1$, $LH_1$, $HL_1$, $HH_1$ may have the resolution of 10 bits per component.

In FIG. 4, the first transformed image 400 shows high frequency brightness changes in the horizontal direction (along the x axis). The second transformed image 402 shows high frequency brightness changes in the vertical direction (along the y axis). The third transformed image 404 shows high frequency brightness changes in the diagonal direction (along the line defined by the equation x=y). The three transformed images are referred to as the HL (High-Low), LH (Low-High) and HH (High-High) images, respectively. The original image may then be low pass filtered and downscaled to produce a smaller approximation of the original image, the $LL_1$ (or Low-Low) image, or the first approximated image 406. The wavelet transformation may be applied iteratively, so that the first approximated image 406 may be put through a wavelet transformation, to produce fourth, fifth and sixth transformed images 408, 410, 412, which are a further set of HL, LH and HH images derived from the first approximated image 406, together with a second approximate image 414 which is still smaller than the first approximated image 406.

Again, the second approximate image 414 may be put through a wavelet transformation, to produce seventh, eighth and ninth transformed images 416, 418, 420, which are a further set of HL, LH and HH images, together with a third approximate image 422 which is smaller than the second approximate image 414.

In this way a pyramid of images may be formed, with the first, second and third transformed images 400, 402, 404 on the first and lowest level, the fourth, fifth and sixth images 408, 410, 412 on the second level, the seventh, eighth and ninth transformed images 416, 418, 420 on the third level, and so on.

Calculation of wavelet coefficients increases the bit number of the results as compared to the original values. At each wavelet level, incremental numbers of bits are added. Two bits may be suitable for a Haar filter, for example. If the compression is lossless, all the additional bits have to be kept, so that the levels of the pyramid may climb from 12 bits to 14 bits to 16 bits and so on. For lossy compression, additional bits may be truncated during the later quantization of the components, as described below.

Although FIG. 4 only shows the wavelet transformations being carried out three times to produce a final approximated image 422, the process of wavelet transformation may be repeated as many times as desired. Typically, more iterations of transformation will increase the compression of the image and so decrease the memory required to store it, but also increases the time and hardware complexity required to encode and decode the image. For some applications it will be appropriate to apply compression for only one or two levels. However the technique may also go further, for example to six or seven levels, or even more.

Hence the transformations provide storable components 424 via a number of intermediate components 426.

Once the desired level of transformation has been reached, the final approximate image 422 may be stored. The transformed images (400, 402, 404, 408, 410, 412, 416, 418 and 420) may then be processed and entropy coded, also for storage.

Returning to FIG. 3, the components of the LH, HL and HH images (for example the first, second and third images 400, 402, 404) next undergo quantization 204. Depending upon the needs of the user, quantization may be carried out in a variety of ways. Firstly, the components may undergo variable bit rate encoding 300. Where variable bit rate encoding is used, a higher bit rate may be used for higher levels of the transformed images pyramid, such as the seventh, eighth and ninth transformed images 416, 418, 420. A change in a component from the highest level of the pyramid during the encoding and decoding process will affect every stage of the decoding process, growing with each transformation, and consequently have a much greater effect on the eventual appearance of the decoded image than a change in a component on the lowest level of the pyramid.

The components may also be clipped 301, by reducing the number of bits used to store each component. For example, each component may be reduced to the nearest approximate eight bit number. The number of bits may be different, and again a higher bit rate may be used for higher levels of the transformed images pyramid.

Figure 5:
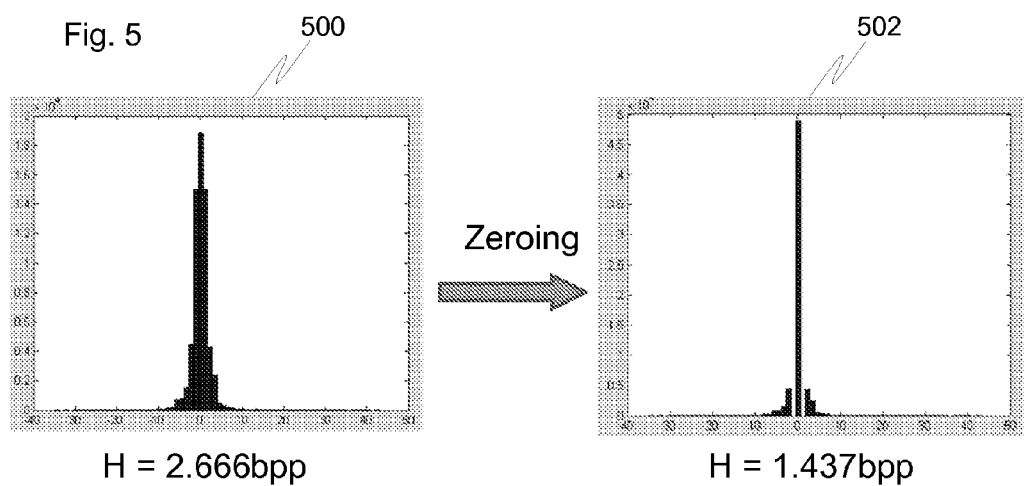
FIG. 5 illustrates an example of zeroing.

The components may also undergo zeroing 302. FIG. 5 illustrates a process of zeroing components 500, whereby the low value components may be reduced to 0 to produce quantized components 502. In other words, the quantization may comprise replacing any component with a value less than x and greater than −x, where x is a positive real number, with a component with a value of zero. While variable bit rate encoding may be lossless or near-lossless, zeroing inevitably involves the loss of information.

Returning to FIG. 3, after the components have been quantized, they may then be run length encoded (RLE) 303, whereby a string of components may be encoded by storing a string of n numbers with the value x in the format x|n, such that the string:

1,1,1,0,0,3,4,5,6,0,0,0,0,0,0,0,0,0,3,7,0,1,1,0,0,0,0,1,1,1 becomes:

1|3,0|2,3|1,4|1,5|1,6|1,0|9,3|1,7|1,0|1,1|2,0|4,1|3.

The present example may use a modified form of run length encoding, i.e. zero run length encoding, whereby only runs of the digit 0 may be encoded, such that the string:

1,1,1,0,0,3,4,5,6,0,0,0,0,0,0,0,0,0,3,7,0,1,1,0,0,0,0,1,1,1 becomes:

1,1,1,0|2,3,4,5,6,0|9,3,7,0|1,1,1,0|4,1,1,1.

Since zeroing increases the number of zeros in the components, it is especially beneficial to use zero run length encoding with quantized components which have been zeroed.

The statistics of a previous frame or encoding block may be used in order to provide higher degree of zeroing or non-linear quantization.

Once quantisation and zero run length encoding are complete, the quantized components may be then further encoded to produce an exponent and a mantissa for each component 304.

The exponent of each component may be determined by the equation:

$$E=\mathrm{ceil}(\log_2((\mathrm{abs}(C))+1)) \quad (1)$$

where E is the exponent, C is the component, abs( ) is a function which takes the absolute value of an input and ceil( ) is a function which maps an input to the next highest integer.

The mantissa of each component may be determined by the equations:

$$M=C \text{ if } C>0 \quad (2)$$

$$M=C-1+2^E \text{ if } C<0 \quad (3)$$

where M is the value of the mantissa. M is undefined, and no mantissa is created, if C=0.

The mantissa may be stored as a binary number m. The number of digits in m is the same as the value of the exponent, by definition.

Figure 6:
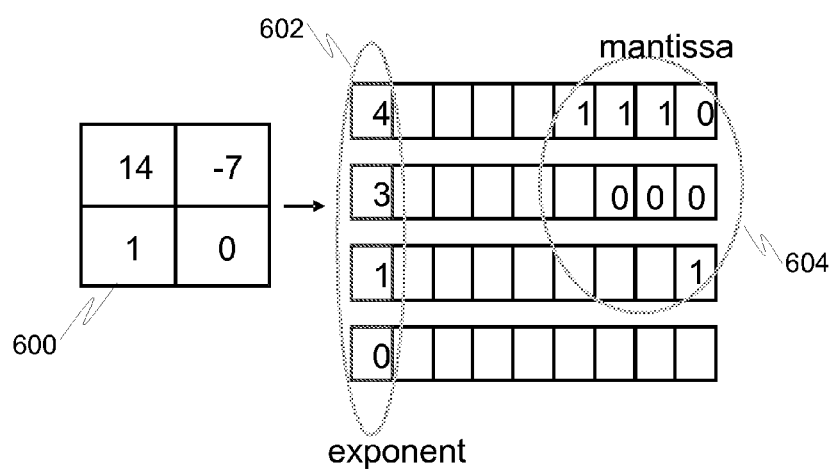
FIG. 6 is an example of the process of deriving exponents and mantissas.

FIG. 6 shows four components 600 and their derived exponents 602 and mantissas 604. As can be seen, if C=14 then E=4 (according to equation 1) and M=14 (according to equation 2) in base ten. In binary the mantissa m=1110, which has the same number of digits as the value of E.

If C=-7, then E=3 (according to equation 1) and M=0 (according to equation 2), in base ten. In binary m also has a value of zero, but since E=3, m is represented by three digits with the same numerical value, as m=000.

To provide a contrasting example; if C=-6 then E=3 and M=1 in base ten. In binary, the mantissa would therefore be m=001.

If C=1, then E=1 and m=1, as shown in FIG. 5.

If C=0, then E=0 and, as noted above, there is no mantissa.

Returning to FIG. 3, once the values of the exponents and the mantissas have been calculated they may be separated into exponent and mantissa, respectively, 306 and further encoded separately.

To further reduce the size of the information to be stored, the mantissas may be clipped 310. During clipping, any mantissa with more than a predefined number of bits may be reduced, to the value of m which will give the closest results during decoding. The mantissas m may be clipped to a predetermined length of 5 bits, or 4 bits, or any other preferred length. In each case where a mantissa m is clipped, the exponent E may be consequently changed as well to reflect the change in the length of m.

The clipping process reduces the overall size of the mantissas, and reduces the variety of values of E, which will typically increase the compression ratio achieved by the subsequent group encoding of the values of E.

Figure 7:
FIG. 7 illustrates images compressed according to different levels of compression.
Figure 7:

The level of clipping may be controlled in order to compromise between video quality and compression ratio. FIG. 7 shows the difference in the quality of an image when it is encoded and subsequently decoded with four bit clipping 700 (whereby every m value longer than four bits is clipped to four bits) and that same image when it is encoded and decoded with five bit clipping 702.

As such, the method of FIG. 3 allows rate distortion control, in that the distortion level may be controlled by adjusting the level of clipping.

Returning to FIG. 3, the exponents may be zero run length encoded 308. Again, in this example the modified form of run length encoding may be used such that only runs of the digit 0 are encoded. Once the exponent is zero run length encoded, the exponent may further be entropy coded.

The entropy coding of the exponent may comprise, for example, Huffman coding 206. This may be done in two ways. The first is using real time dictionary statics 312 acquisition as illustrated in FIG. 2, whereby the exponents may be analysed 208 and an efficient dictionary for use when encoding is derived. Statistical calculations may be performed in real time from the previously encoded image, such that the statistics of a previous image are used to encode the current image. The resulting function may be used for calculation of the Huffman dictionary for the current frame exponents. This approach typically produces a high compression ratio, but takes time and uses hardware resources, while requiring that the derived dictionary is stored for use in later decoding. Alternatively, the Huffman coding may be done with predefined dictionaries 314. The predefined dictionaries may be derived from a statistical analysis of library images, for example. Predefined dictionaries may be quicker to use than derived dictionaries, but may produce a lower level of compression.

Where predefined dictionaries are used, the statistics of the image will typically be estimated by a predefined function which depends, in part, on the pyramid level being encoded.

FIG. 8 is a table showing example exponents and mantissas for different component values, calculated according to the method described above.

Once the exponents and mantissas are suitably encoded and compressed, they may be packed 316 and sent to the memory interface unit 102 to be stored. All components related to the original image 200 may be stored in a single data packet. Alternatively, Luma and chroma data packets may be stored separately.

Variations on the method described above are possible. For example, the components do not need to be quantized or zero run length encoded before the exponents and mantissas are derived.

Figure 9:
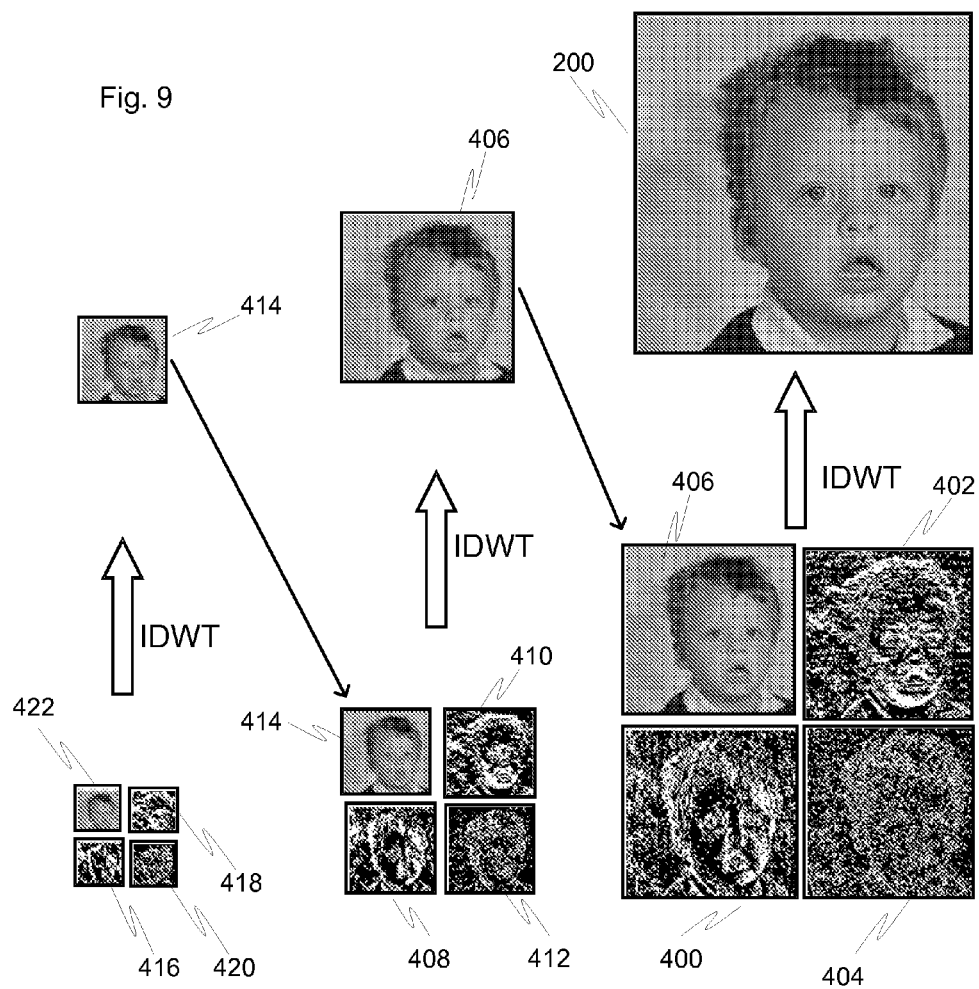
FIG. 9 is a diagram illustrating the process of inverse discrete waveform transformation.

When required, the stored data may be retrieved, and at least an approximation of the original image decoded by the entropy decoder 110 and the IDWT unit 106. FIG. 9 illustrates the process of inverse discrete waveform transformation, as carried out by the IDWT unit 106. During this process, the LH, HL and HH components may be combined with the LL components iteratively, to reproduce the original image 200, in stages In practical applications using standard test images, the compression techniques described above have provided compression ratios of anything from 1.5 up to 7.7, depending upon the choice of processes used; all producing good results when the images are decoded.

The method and device describe above are suitable for wavelet multiresolution compression of video frame buffers, and may be optimized for hadamard wavelet transforms. Depending upon how the method is used, almost lossless compression may be achieved, with high compression ratios. The method is suitable for real time applications such as video processing, particularly based on live feeds which must be processed in real time, and provides a high quality of video while reducing the memory requirements compared to other solutions. The process is also applicable to simple static image processing.

The invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connections that transfers multiple signals serially or in a time multiplexed manner. Likewise, single connections carrying multiple signals may be separated out into various different connections carrying subsets of these signals. Therefore, many options exist for transferring signals.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A method for processing an image, the method comprising:
receiving an image at a processing unit;
encoding the image as a plurality of components;
deriving an exponent, E, for each respective component, C, of the plurality of components, and associating the exponent, E, with only its respective component, C, of the plurality of components;
deriving mantissas wherein at least an approximation of each component, C, can be derived from the exponents and mantissas, and wherein exponent, E, indicates the number of bits in its accompanying mantissa, M;
compressing at least the exponents; and
storing the exponents and the mantissas in a memory.

2. A method as claimed in claim 1, further comprising deriving an exponent, E, to be zero when the component is zero, and providing no mantissa, M, for that component.

3. A method as claimed in claim 1, wherein deriving the mantissa, M, for each component, C, comprises deriving the Mantissa, M, from the respective component C and the exponent E using the equations:

$M=C$ if $C>0$; and $M=C-1+2^E$ if $C<0$.

4. A method as claimed in claim 1, further comprising quantizing the components, before the exponents and mantissas are derived from the quantized components, wherein quantizing the components comprises replacing any component, C, with a value less than x and greater than −x, with a component, C, with a value of zero, where x is a positive real number.

5. A method as claimed in claim 1, further comprising run length encoding the components, before the exponents and mantissas are derived from the run length encoded components.

6. A method as claimed in claim 1, further comprising Huffman coding the exponents.

7. An apparatus for processing an image, the apparatus comprising:
a processing unit and a memory, the processing unit being arranged to retrieve an image from the memory, encode the image as a string of components, derive an exponent, E, for each respective component, C, of the plurality of components, associate the exponent, E, with only its respective component C, of the plurality of components, derive mantissas wherein at least an approximation of each component, C, can be derived from the exponents and mantissas, and wherein exponent, E, indicates the number of bits in its accompanying mantissa, M, compress at least the exponents, and store the exponents and the mantissas in the memory.

8. An apparatus as claimed in claim 7, wherein the processing unit is arranged to derive an exponent, E, of zero when the component is zero, and provide no mantissa, M, for that component.

9. An apparatus as claimed in claim 7, wherein the processing unit is arranged to derive a mantissa, M, for each component, C, by deriving the Mantissa, M, from the respective component C and the exponent E using the equations:

$M=C$ if $C>0$ $M=C-1+2^E$ if $C<0$.

10. An apparatus as claimed in claim 7, wherein the processing unit is arranged to quantize the components, before the exponents and mantissas are derived from the quantized components.

11. An apparatus as claimed in claim 10, wherein quantizing the components comprises replacing any component, C, with a value less than x and greater than −x, with a component, C, with a value of zero, where x is a positive real number.

12. An apparatus as claimed in claim 7, wherein the processing unit is arranged to run length encode the components, before the exponents and mantissas are derived from the run length encoded components.

13. An apparatus as claimed in claim 7, wherein the processing unit is arranged to Huffman code the exponents.

14. An apparatus as claimed in claim 7, wherein the processing unit is arrange to run length encode the exponents.

15. An apparatus as claimed in claim 7, wherein the processing unit is arranged to compress the mantissas prior to storing the mantissas by replacing any mantissa, M, which comprises more than a predetermined number of bits with a mantissa, M, which comprises fewer bits.

16. An apparatus as claimed in claim 12, wherein the run length encoding is zero run length encoded.

17. An apparatus as claimed in claim 7, wherein the processing unit is arranged to encode the image using wavelet transforms.

18. An article comprising a non-transitory computer readable storage medium having instructions stored thereon that, when executed by a computing platform operate to carry out the method of claim 1.

19. The method of claim 1, further comprising compressing the mantissas prior to storing the mantissas by replacing any mantissa, M, which comprises more than a predetermined number of bits with a mantissa, M, which comprises fewer bits.

20. A method for processing an image, the method comprising:
receiving an image at a processing unit;
encoding the image as a plurality of components;
deriving an exponent, E, for each component, C, wherein there is a one-to-one correspondence between each derived exponent, E, and component, C;
deriving mantissas wherein at least an approximation of each component, C, can be derived from the exponents and mantissas, and wherein each exponent, E, indicates the number of bits in its accompanying mantissa, M;
compressing at least the exponents;
compressing the mantissas by replacing any mantissa, M, which comprises more than a predetermined number of bits with a mantissa, M, which comprises fewer bits; and
storing the exponents and the compressed mantissas in a memory.

* * * * *